Patented Mar. 20, 1923.

1,448,846

UNITED STATES PATENT OFFICE.

WALTER L. JORDAN, OF NEW YORK, N. Y.

PROCESS FOR MAKING A COMPOSITION FOR PURIFYING LIQUIDS.

No Drawing.   Application filed October 28, 1919.   Serial No. 334,026.

*To all whom it may concern:*

Be it known that I, WALTER L. JORDAN, a citizen of the United States, residing at New York, in the county of New York and State of New York, have invented a new and useful Process for Making a Composition for Purifying Liquids, of which the following is a specification.

The present invention is a continuation in part of my prior application entitled, Composition for purifying liquids, and process of making the same, filed November 21, 1916, Ser. No. 132,622.

This invention relates to means for the purification of liquids, for the purpose of decolorizing, defecating, clarifying or otherwise removing objectionable constituents in sugar solutions or other liquids. The main object of the present invention is to provide a material for this purpose which can be used in place of bone-black or bone-char, and which will be much cheaper than bone-black and less subject to deterioration, especially in revivification.

My improved decolorizing and purifying agent consists essentially of a porous mass of granular, coherent diatomaceous earth artificially impregnated with carbon. The diatomaceous earth is preferably dried and calcined above 1700° F. and to a point at which its mechanical strength is suitably increased, after which it is granulated and then impregnated with carbonizable organic material, and subjected to heat in such manner as to drive off volatile constituents of the impregnating substance and leave the carbon in a state of extremely fine division disseminated or distributed throughout the mass. The diatomaceous earth is practically free from carbonaceous matter, or rendered so by the calcining treatment. A diatomaceous earth, found at Lompoc, California, is especially suitable for my process. but it will of course be understood that the invention is not limited to the use of this particular material.

The particular material or process employed for impregnating the diatomaceous earth is not in itself a novel feature of the invention herein claimed, and this portion of the invention may be carried out in any approved manner.

In refining sugar by means of bone-black, the bone-black is subjected to considerable handling and abrasion in the process of revivifying. This handling partially disintegrates the bone-black, creating dust which it is necessary to remove by screening and discard before returning the revivified material for reuse. This wastage is replaced from time to time in order to maintain the proper quantity of bone-char in the process.

Therefore a material which is to be used in this way must be capable of withstanding the treatment involved in its use. The material provided by the present invention takes advantage of the highly porous nature of the diatomaceous earth, as a material in which to deposit the carbon, while at the same time it possesses much better mechanical strength and durability, due to the particular heat treatment provided by the process. The natural diatomaceous earth without such heat treatment is entirely unsuited to withstanding this handling.

The preferred mode of making my improved material, particularly in case the same is to be used in treatment of sugar solutions is as follows: The diatomaceous earth is calcined at a sufficiently high temperature (for example 2200° F) to cause a substantial increase in its mechanical strength, and to make it sufficiently coherent to prevent disintegration under the conditions of use. The calcined diatomaceous earth is then crushed to a suitable state of division, preferably to a granulated condition, corresponding in size of particles to the usual bone-char, for example. The granulated calcined diatomaceous earth is then soaked in a liquid such as blood, tankage or other packing house waste; glue; molasses, either beet or cane; or concentrated waste lye from paper mills; and in the case of molasses, it is very advantageous to impregnate while the liquid is hot. After the diatomaceous earth is thoroughly impregnated with the carbon-containing liquid, it is charged (either after preliminary drying or without such drying) into a retort wherein it is charred at such temperature as to drive off volatile constituents and leave carbon distributed throughout the mass of diatomaceous earth, the porosity of such mass being such as to expose such carbon in all parts thereof to the action of any liquid which may be brought in contact with the mass. The temperature used in charring must not be so high as to cause conversion of the carbon into graphite.

The calcined diatomaceous earth furnishes a comparatively strong rigid support for the finely divided carbon, in such manner as to expose the carbon most effectively for contact or absorptive action on the impurities in the liquid, while permitting free percolation through the mass, and it is especially advantageous in not being so subject to disintegration during revivification, being superior in this respect to the ordinary bone-char.

I claim:

The process of making a composition for purifying liquids, which comprises calcining diatomaceous earth at a temperature above 1700° F., granulating the calcined material, impregnating the granulated calcined material with a carbonizable substance, and heating the impregnated material to char the carbonizable substance.

WALTER L. JORDAN.